United States Patent
Fujihara et al.

(10) Patent No.: US 10,525,336 B2
(45) Date of Patent: Jan. 7, 2020

(54) IMAGE PROCESSING SYSTEM, IMAGE PROCESSING METHOD, PROGRAM, AND INFORMATION STORAGE MEDIUM

(71) Applicant: Sony Interactive Entertainment Inc., Tokyo (JP)

(72) Inventors: Masahiro Fujihara, Tokyo (JP); Akira Miyashita, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/328,767

(22) PCT Filed: Aug. 27, 2015

(86) PCT No.: PCT/JP2015/074184
§ 371 (c)(1),
(2) Date: Jan. 24, 2017

(87) PCT Pub. No.: WO2016/039155
PCT Pub. Date: Mar. 17, 2016

(65) Prior Publication Data
US 2017/0209787 A1    Jul. 27, 2017

(30) Foreign Application Priority Data
Sep. 11, 2014  (JP) ................................. 2014-185257

(51) Int. Cl.
*A63F 13/213* (2014.01)
*A63F 13/655* (2014.01)
(Continued)

(52) U.S. Cl.
CPC .......... *A63F 13/213* (2014.09); *A63F 13/215* (2014.09); *A63F 13/30* (2014.09);
(Continued)

(58) Field of Classification Search
CPC ........ A63F 13/00; A63F 13/02; A63F 13/213; A63F 13/219; A63F 13/655; A63F 13/20; A63F 13/60; A63F 13/85; A63F 13/86
(Continued)

(56) References Cited

U.S. PATENT DOCUMENTS 6,435,969 B1 * 8/2002 Tanaka .................... A63F 13/02
  463/44
9,491,430 B2   11/2016 Maeda
(Continued)

FOREIGN PATENT DOCUMENTS

| JP | 2007300562 A | 11/2007 |
| JP | 2012174237 A | 9/2012 |

(Continued)

OTHER PUBLICATIONS

International Search Report for corresponding PCT Application No. PCT/JP2015/074184, 4 pages, dated Oct. 6, 2015.
(Continued)

*Primary Examiner* — Chase E Leichliter
(74) *Attorney, Agent, or Firm* — Matthew B. Dernier, Esq.

(57) ABSTRACT

An image processing system, an image processing method, a program, and an information storage medium for saving more time and effort than ever in excluding an unwanted image from an image to be delivered, the latter image being one in which is disposed an image captured of a user during play of a game, the captured image being disposed in a region occupying a portion of an image indicating the content of the game being played. A play image acquiring section acquires a play image indicative of game play content. A captured image acquiring section acquires a captured image captured by a camera during play of the game. A user image generating section generates a user
(Continued)

image occupying in the captured image a region in which is disposed an image of the user as a delivery target. A delivery image to be delivered is generated on the basis of the play image and the user image.

7 Claims, 12 Drawing Sheets

(51) Int. Cl.
  *A63F 13/86* (2014.01)
  *A63F 13/53* (2014.01)
  *A63F 13/30* (2014.01)
  *A63F 13/215* (2014.01)
  *A63F 13/60* (2014.01)

(52) U.S. Cl.
  CPC ............ *A63F 13/53* (2014.09); *A63F 13/655* (2014.09); *A63F 13/86* (2014.09); *A63F 13/60* (2014.09)

(58) Field of Classification Search
  USPC .................................................. 463/1, 30–34
  See application file for complete search history.

(56) References Cited

U.S. PATENT DOCUMENTS

| | | | | |
|---|---|---|---|---|
| 9,595,146 | B2* | 3/2017 | Smith | G07C 9/00158 |
| 2004/0193413 | A1* | 9/2004 | Wilson | G06F 3/017 |
| | | | | 704/243 |
| 2006/0277571 | A1* | 12/2006 | Marks | A63F 13/00 |
| | | | | 725/37 |
| 2009/0202114 | A1* | 8/2009 | Morin | A63F 13/12 |
| | | | | 382/118 |
| 2009/0244309 | A1* | 10/2009 | Maison | G06K 9/00369 |
| | | | | 348/222.1 |
| 2010/0067743 | A1* | 3/2010 | Tanne | G06F 3/0346 |
| | | | | 382/103 |
| 2010/0075749 | A1* | 3/2010 | Seshadri | A63F 13/10 |
| | | | | 463/29 |
| 2012/0057850 | A1* | 3/2012 | Klappert | H04N 21/23424 |
| | | | | 386/278 |
| 2012/0059953 | A1* | 3/2012 | Klappert | H04N 9/75 |
| | | | | 709/236 |
| 2012/0060095 | A1* | 3/2012 | Klappert | H04N 21/458 |
| | | | | 715/722 |
| 2012/0157200 | A1* | 6/2012 | Scavezze | H04N 5/225 |
| | | | | 463/31 |
| 2012/0218266 | A1* | 8/2012 | Maeta | H04N 13/0011 |
| | | | | 345/422 |
| 2012/0295705 | A1* | 11/2012 | Hanawa | A63F 13/213 |
| | | | | 463/31 |
| 2013/0033614 | A1* | 2/2013 | Chang | G06T 11/00 |
| | | | | 348/222.1 |
| 2014/0254902 | A1* | 9/2014 | Sugawara | A61B 5/1171 |
| | | | | 382/128 |
| 2015/0002390 | A1* | 1/2015 | Park | G06F 3/017 |
| | | | | 345/156 |
| 2016/0114243 | A1* | 4/2016 | Matsuura | A63F 13/5258 |
| | | | | 463/31 |
| 2016/0364561 | A1* | 12/2016 | Lee | H04M 1/67 |

FOREIGN PATENT DOCUMENTS

| | | |
|---|---|---|
| JP | 2012239719 A | 12/2012 |
| JP | 2014155564 A | 8/2014 |

OTHER PUBLICATIONS

International Preliminary Report on Patentability and Written Opinion for corresponding PCT Application No. PCT/JP2015/074184, 16 pages, dated Mar. 14, 2017.

\* cited by examiner

| USER ID | PASSWORD | REGISTERED FACE IMAGE |
|---------|----------|------------------------|
| a123 | p123 | |
| b456 | p456 | |

FIG.11

| USER ID | PASSWORD | REGISTERED FACE IMAGE | APPROVAL/ DENIAL DATA |
|---|---|---|---|
| a123 | p123 | | APPROVED |
| b456 | p456 | | APPROVED |

IMAGE PROCESSING SYSTEM, IMAGE PROCESSING METHOD, PROGRAM, AND INFORMATION STORAGE MEDIUM

TECHNICAL FIELD

The present invention relates to an image processing system, an image processing method, a program, and an information storage medium.

BACKGROUND ART

In recent years, users have been able to register moving images easily with moving image delivery systems run by moving image delivery business operators, the moving images being those indicating the content of a game being played or those captured of the user playing the game. The moving images thus registered are delivered to the users requesting the images to be delivered.

Some moving image delivery business operators offer the service of streaming moving images live. This type of service allows users to casually take up live streaming delivery of moving images.

Some game devices allow a user playing a game to transmit to the moving image delivery system a moving image indicative of the content of the game being played or a moving image captured of the user playing the game, the transmission being executed by the user performing a predetermined operation during play of the game. The moving image thus transmitted to the moving image delivery system is streamed live or stored therein for subsequent delivery to users requesting the image to be delivered.

There is a technology that permits delivery of a moving image composed of a frame image in which is disposed an image captured of a user during play of a game, the captured image occupying a portion of the moving image indicating game play content. There also exists a technology that delivers a moving image made up of two juxtaposed images, one image representing game play content, the other image being captured of the user during play of the game. Such technologies are useful for users wishing to deliver a moving image indicative of both game play content and the way the user is playing the game.

SUMMARY

Technical Problem

In delivering the above-described image generated from both the image representing game play content and the image captured of the user during play of the game, the user may wish to exclude a portion of the moving image to be delivered, the portion revealing the user's room interior or a family member's face, for example. In the past, such a situation required the user to suitably position and orient the camera so that the unwanted portion would be excluded from the angle of view. The chores involved apply not only to the delivery of moving images but also to the delivery of still images.

The present invention has been made in view of the above circumstances and provides as an object an image processing system, an image processing method, a program, and an information storage medium for saving more time and effort than ever in excluding an unwanted image from an image to be delivered, the latter image being generated from both an image representing game play content and an image captured of a user during play of a game.

Solution to Problem

In solving the above problem and according to the present invention, there is provided an image processing system including: a play image acquiring section configured to acquire a play image indicative of the content of a game being played; a captured image acquiring section configured to acquire a captured image captured by a camera during play of the game; and a user image generating section configured to generate a user image occupying in the captured image a region in which is disposed an image of a user as a delivery target. A delivery image to be delivered is generated on the basis of the play image and the user image.

Further, according to the present invention, there is provided an image processing method including: a step of acquiring a play image indicative of the content of a game being played; a step of acquiring a captured image captured by a camera during play of the game; a step of generating a user image occupying in the captured image a region in which is disposed an image of a user as a delivery target; and a step of generating a delivery image to be delivered on the basis of the play image and the user image.

Further, according to the present invention, there is provided a program for causing a computer to execute: a procedure of acquiring a play image indicative of the content of a game being played; a procedure of acquiring a captured image captured by a camera during play of the game; and a procedure of generating a user image occupying in the captured image a region in which is disposed an image of a user as a delivery target. A delivery image to be delivered is generated on the basis of the play image and the user image.

Further, according to the present invention, there is provided a computer-readable information storage medium storing a program for causing a computer to execute: a procedure of acquiring a play image indicative of the content of a game being played; a procedure of acquiring a captured image captured by a camera during play of the game; and a procedure of generating a user image occupying in the captured image a region in which is disposed an image of a user as a delivery target. A delivery image to be delivered is generated on the basis of the play image and the user image.

In one mode of the present invention, the delivery image is generated when the user image is disposed in a region occupying a portion of the play image.

Further, in one mode of the present invention, the user image generating section generates the user image occupying in the captured image a region in which an image of the user playing the game is disposed.

Alternatively, the user image generating section generates the user image occupying in the captured image a region in which is disposed a user image stored in a storage section or an image identified on the basis of information associated with the stored user image.

In this mode, the user image generating section may generate the user image occupying in the captured image a region in which is disposed an image of the user having logged in to play the game or an image identified on the basis of information associated with the image of the login user, the user image being one of the user images stored in the storage section or one of pieces of information associated with the stored user images.

Alternatively, the user image generating section generates the user image occupying in the captured image a region in which is disposed an image of the user identified on the basis of the position in the captured image of a region in which is disposed an image of a controller being used to play the game.

Further, in one mode of the present invention, the user image generating section generates the user image occupying in the captured image a region in which is disposed an image of a subject having a distance to the camera, the distance being shorter than a reference distance.

Further, in one mode of the present invention, the image processing system further includes a delivery image generating section configured to generate the delivery image in which the user image is disposed in a region occupying a portion of the play image.

In this mode, the delivery image generating section may generate the delivery image in which the user image is disposed in a region occupying a portion of the play image, the region being determined depending on the state of the game being played.

BRIEF DESCRIPTION OF DRAWINGS

FIG. 11 is a tabular view showing other typical account data.

DESCRIPTION OF EMBODIMENT

One preferred embodiment of the present invention will now be described below in detail with reference to the accompanying drawings.

Figure 1:
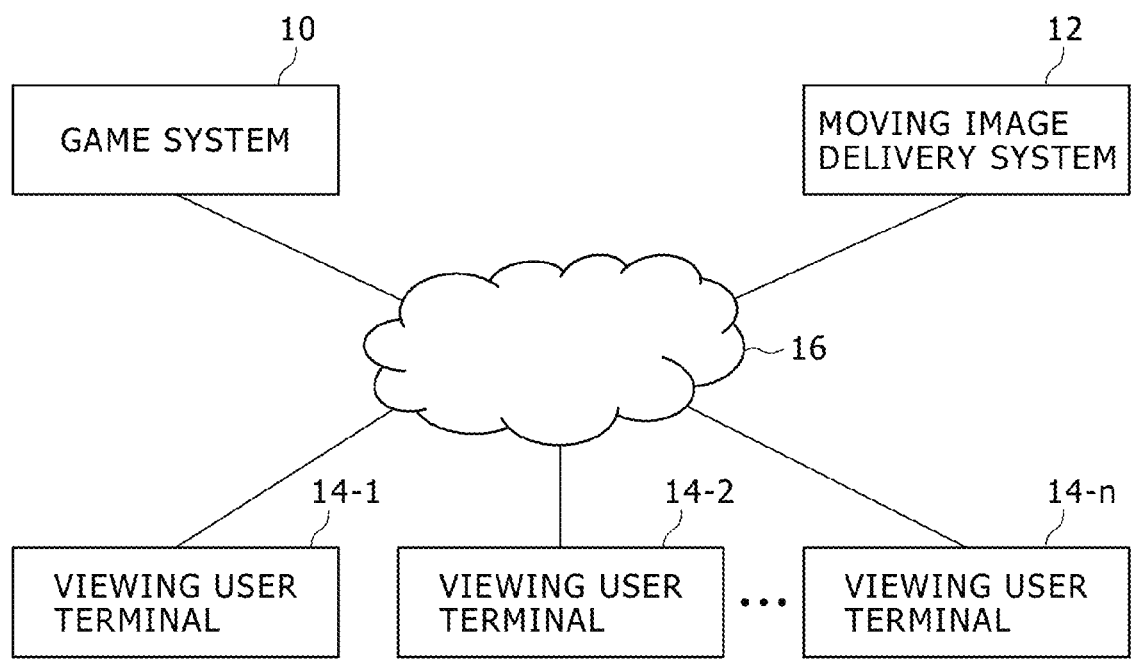
FIG. 1 is a schematic view showing a typical overall configuration of a computer network as an embodiment of the present invention.

FIG. 1 is a schematic view showing a typical overall configuration of a computer network as an embodiment of the present invention. As shown in FIG. 1, a computer network 16 such as the Internet is connected with a game system 10, a moving image delivery system 12, and a plurality of viewing user terminals 14 (14-1 to 14-n), each system and terminal structurally centering on a computer.

The game system 10, moving image delivery system 12, and viewing user terminals 14 are mutually communicable.

The moving image delivery system 12 of the present embodiment are constituted by computers such as servers that offer moving image delivery services including the service of delivering registered moving images and the service of streaming moving images live.

Each viewing user terminal 14 of the present embodiment is a computer for use by a user viewing moving images delivered by the moving image delivery system 12. The viewing user terminal 14 may be a personal computer, a game console, a handheld video game machine, or an information terminal, for example.

Figure 2:
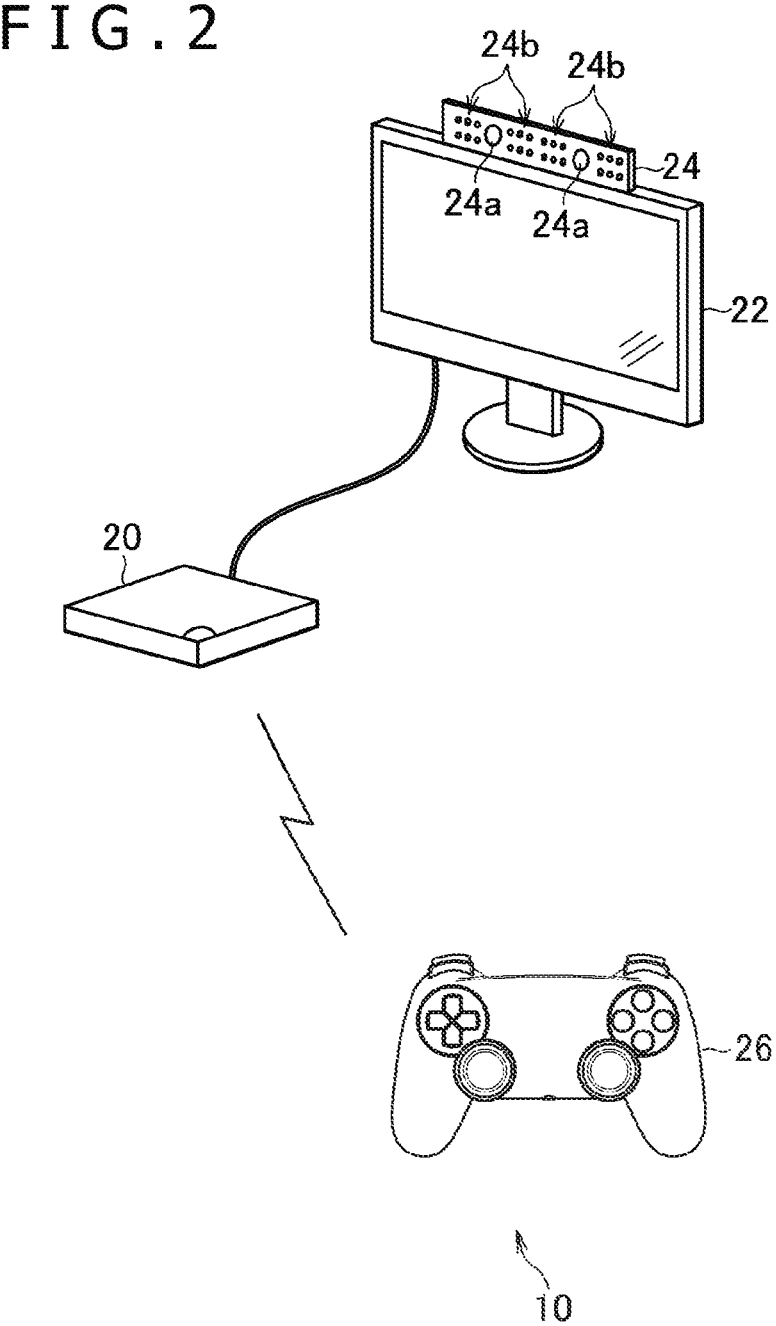
FIG. 2 is a schematic view showing a typical overall configuration of a game system as an embodiment of the present invention.

The game system 10 of the present embodiment is an information processing system for use by a user offering the moving image that is delivered by the moving image delivery system 12 to the users of the viewing user terminals 14 for viewing. As shown in FIG. 2, the game system 10 includes a game device 20, a display unit 22, a camera-microphone unit 24, and a controller 26.

Figure 3:
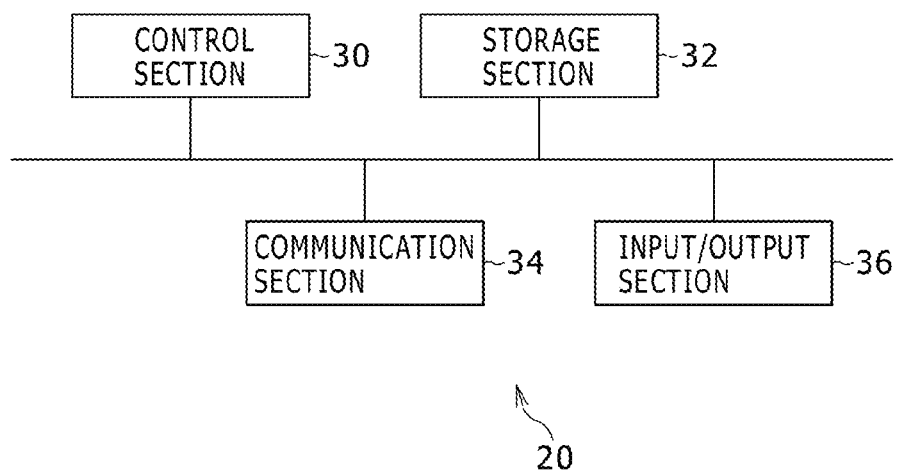
FIG. 3 is a schematic view showing a typical hardware structure of a game device as an embodiment of the present invention.

The game device 20 of the present embodiment is a computer such as a game console. The game device 20 includes for example a control section 30, a storage section 32, a communication section 34, and an input/output section 36, as shown in FIG. 3. The control section 30 may be a program control device such as a central processing unit (CPU) that runs in accordance with programs installed in the game device 20. The control section 30 of the present embodiment includes a graphics processing unit (GPU) that renders images in a frame buffer on the basis of graphics commands and data supplied from the CPU. The storage section 32 may be a storage element such as a read only memory (ROM) or a random access memory (RAM) or a hard disk drive. The storage section 32 stores, for example, the programs to be executed by the control section 30. Also, the storage section 32 of the present embodiment provides a frame buffer area in which the GPU renders images. The communication section 34 may be a communication interface such as a network board or a wireless local area network (LAN) module. The input/output section 36 is an input/output port such as a high-definition multimedia interface (HDMI) (registered trademark) port or a universal serial bus (USB) port.

The display unit 22 of the present embodiment is for example a liquid crystal display that displays the screen generated by the game device 20. Also, the display unit 22 has speakers that output sounds represented by audio data generated by the game device 20.

The camera-microphone unit 24 of the present embodiment includes cameras 24a that output an image captured of a target subject to the game device 20 and microphones 24b that output to the game device 20 acquired ambient sounds being converted to audio data. The cameras 24a of the present embodiment constitute a stereo camera. It follows that the cameras 24a are capable of generating an image representing a distribution of distances from the cameras 24a to the target subject in a direction perpendicular to a plane of projection of an image captured of the subject for each of the pixels included in the captured image.

The game device 20 and the display unit 22 are interconnected by an audio-visual (AV) cable or by an HDMI cable, for example. The game device 20 and the camera-microphone unit 24 are interconnected by a USB cable, an AV cable, or an HDMI cable for example.

Figure 4A:
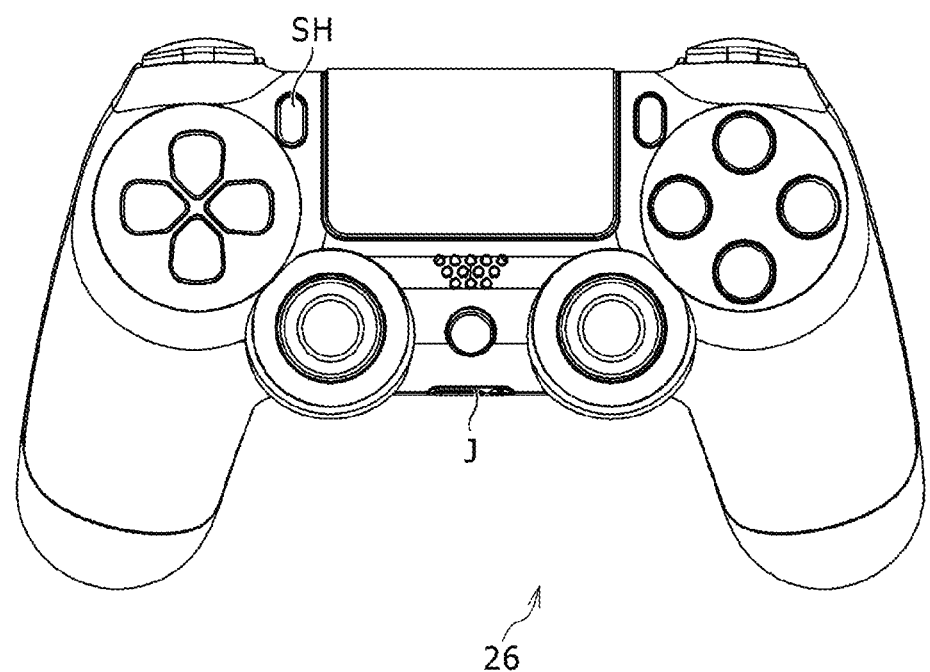
FIG. 4A is a plan view of a typical controller as an embodiment of the present invention.
Figure 4B:
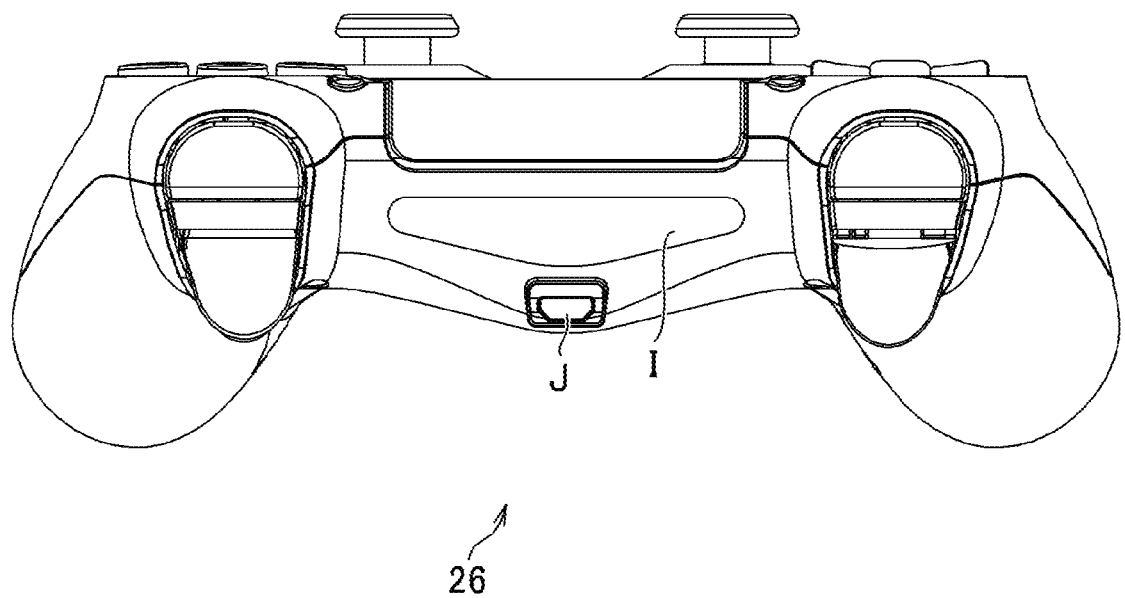
FIG. 4B is a rear view of the controller shown in FIG. 4A.

The controller 26 of the present embodiment is an operation input device configured to perform input operations to the game device 20. FIG. 4A is a plan view of the controller 26 of the present embodiment. FIG. 4B is a rear view of the controller 26.

At the top left of the upper surface of the controller 26 is a button SH for starting moving image delivery. At the underside of the rear center of the controller 26 is an indicator I made of a light emitting diode (LED) capable of emitting light in one of predetermined colors.

The controller 26 of the present embodiment also has arrow keys, buttons, a touch sensor, and operating sticks. The controller 26 of the present embodiment further includes sensors such as a gyro sensor for detecting angular velocity and an acceleration sensor for detecting acceleration.

The controller 26 of the present embodiment also has a jack J into which a microphone may be plugged for voice input. The voice picked up by the microphone plugged into the controller 26 is converted to audio data by the controller 26 before being output to the game device 20.

The user using the controller 26 can perform various input operations by pressing the arrow keys and buttons or by tilting the operating sticks. In the present embodiment, the controller 26 outputs input data associated with the input operations to the game device 20.

The controller 26 of the present embodiment also has a USB port. When connected to the game device 20 by a USB cable, the controller 26 can output the input data in wired fashion to the game device 20 via the input/output section 36. The controller 26 of the present embodiment may further include a wireless communication module that outputs the input data wirelessly to the game device 20 via the communication section 34.

When the controller 26 of the present embodiment transmits to the game device 20 a signal indicating that the controller 26 is in use, the game device 20 sends back to the controller 26 a signal representing the color in which the indicator I is to be illuminated. In turn, the controller 26 lights the indicator I in the color designated by the returned signal. In the present embodiment, a controller 26 that first transmits the above-mentioned signal has its indicator I illuminated in blue, and another controller 26 that transmits the signal next has its indicator I illuminated in red, for example.

In the present embodiment, the user first logs in to the game device 20. The login user then executes a game program installed in the game device 20 to play the game.

A moving image starts to be streamed live by the moving image delivery system 12 when a user playing a game performs a predetermined series of operations including the pressing of the button SH before or during play of the game. This allows the user of each viewing user terminal 14 to view the moving image being streamed live. Also in the present embodiment, the moving image delivery system 12 stores the moving image while streaming it live. The stored moving image is delivered upon request to each requesting viewing user terminal 14.

Figure 5:
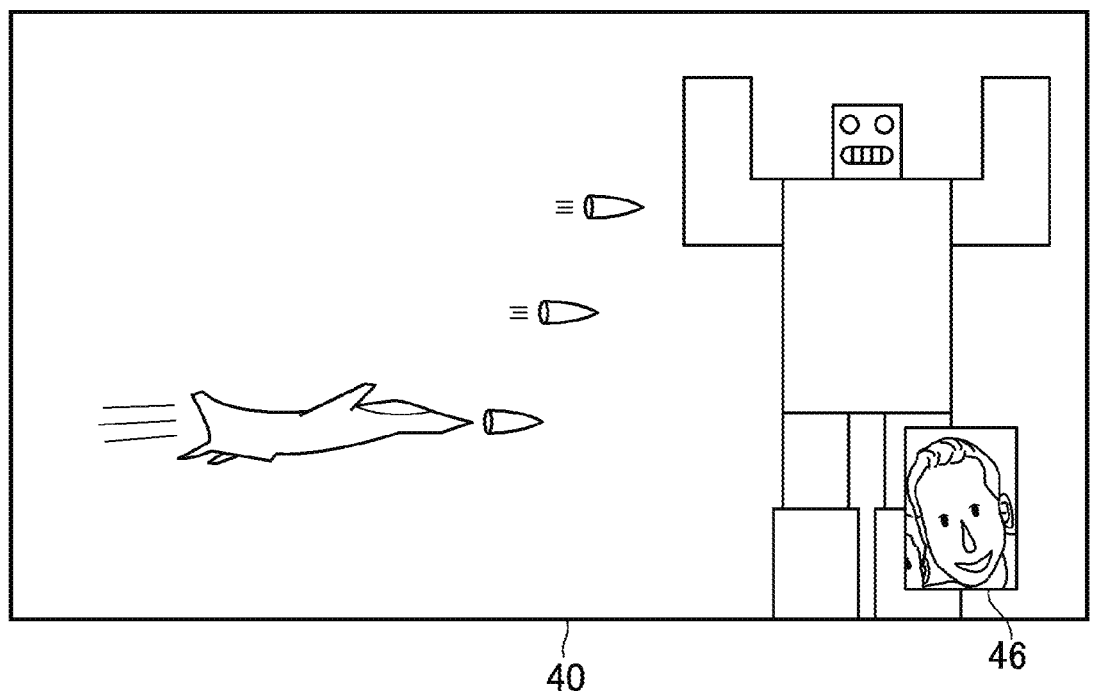
FIG. 5 is a schematic view showing a typical delivery image.
Figure 6:
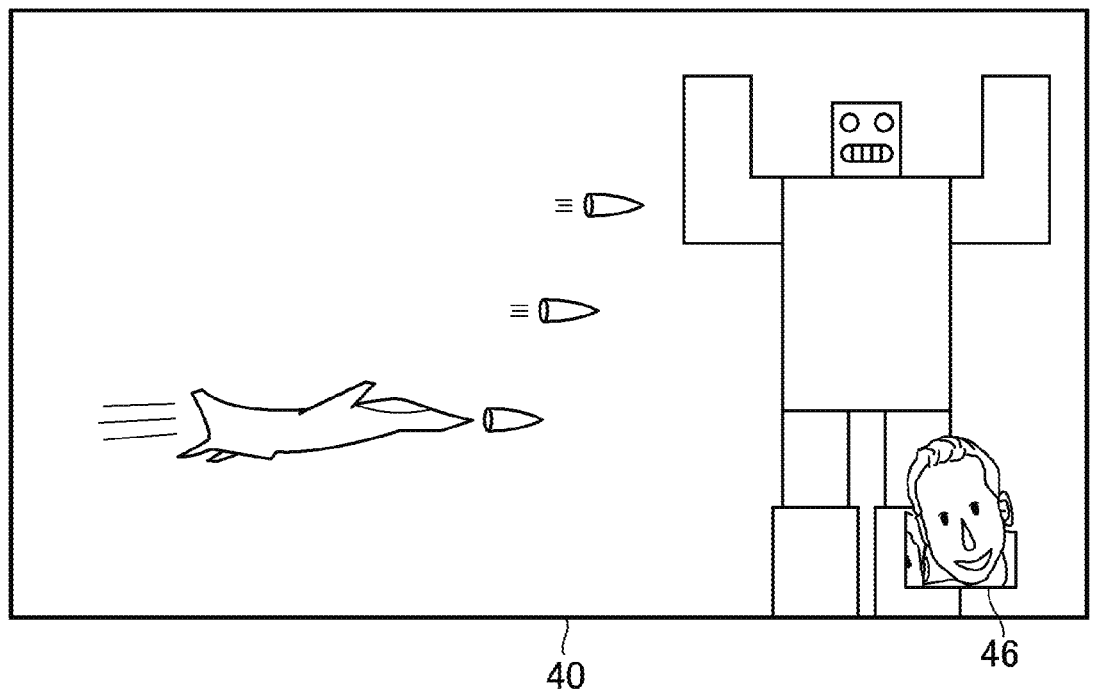
FIG. 6 is a schematic view showing another typical delivery image.
Figure 7:
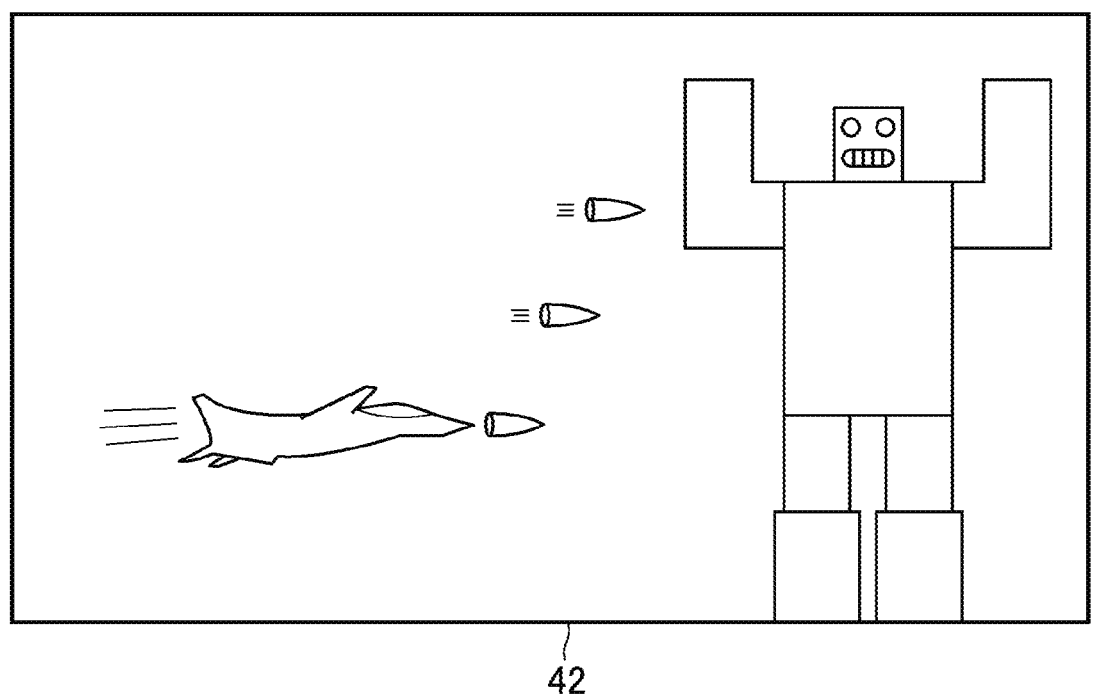
FIG. 7 is a schematic view showing a typical play image.
Figures 8, 9:
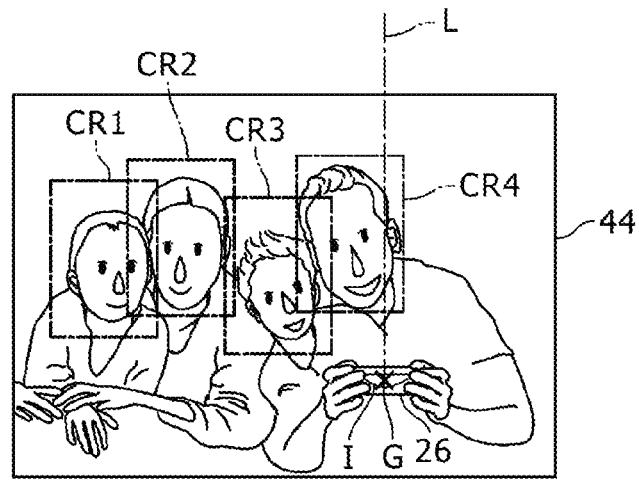
FIG. 8 is a schematic view showing a typical captured image.
FIG. 9 is a tabular view showing typical account data.

FIG. 5 shows an example of a delivery image 40 that is a frame image constituting a moving image being streamed live by the present embodiment. FIG. 6 shows another example of the delivery image 40. In the present embodiment, the delivery image 40 is generated on the basis of two images: a play image 42 indicative of game play content as shown in FIG. 7, and a captured image 44 obtained by the cameras 24a during play of the game as shown in FIG. 8.

The game device 20 of the present embodiment generates the play image 42 at a predetermined frame rate, e.g., at intervals of 1/60 seconds. The cameras 24a generate the captured image 44 also at the predetermined frame rate. The cameras 24a generate, at the predetermined frame rate, a distance distribution image representing, as mentioned above, a distribution of distances from the cameras 24a to the subject in a direction perpendicular to a plane of projection of the captured image 44 for each of the pixels included in the captured image 44. The play image 42, captured image 44, and distance distribution image are generated in a synchronized manner. As such, these images may be related to each other by the generation timing.

In the present embodiment, the delivery image 40 is generated when a user image 46 as part of the captured image 44 associated with the play image 42 is disposed in a region occupying a portion of the play image 42. In another example, the delivery image 40 may be generated by disposing a user image 46 as part of the captured image 44 having the same frame as the play image 42.

Described further below is the process of generating the user image 46, disposed in the delivery image 40 such as one shown in FIG. 5 or FIG. 6, on the basis of the captured image 44 such as one in FIG. 8.

The captured image 44 shown in FIG. 8 includes images of four users. Of these four users in the example of FIG. 8, the rightmost user is playing the game by operating the controller 26.

The present embodiment uses a known face image recognition technique to identify rectangular regions occupying portions of the captured image 44. These regions will be referred to as the candidate regions CR hereunder. In the example of FIG. 8, four candidate regions CR1 to CR4 are identified. Each of the candidate regions CR1 to CR4 includes at least partially an image of one of the users.

In accordance with rules for determining the user as a delivery target, the present embodiment determines at least one of the four candidate regions CR1 to CR4 to be the region serving as the basis for generating the user image 46. The region thus determined will be referred to as the selected region hereunder. For example, the candidate region CR4 is determined to be the selected region on the basis of which the user image 46 shown in FIG. 5 and FIG. 6 is generated.

In the present embodiment, the storage section 32 of the game device 20 stores delivery target determination rule data denoting the rules for determining the user as the delivery target. The selected region is determined on the basis of the delivery target determination rule data.

Alternatively, account data shown in FIG. 9 may be used in determining the selected region. The account data in FIG. 9 includes user identifications (IDs) each identifying a user, passwords each used by the corresponding user at the time of logging in to the game device 20, and registered face images that each user is required to register when generating the account data.

For example, suppose that the value of the delivery target determination rule data is "login user" and that the user currently logging in to the game device 20 has a user ID of "a123." In this case, a known image recognition technique is used to determine as the selected region, from among the candidate regions CR1 to CR4, the region that includes the image most similar to the registered face image associated with the user ID "a123." In this manner, the candidate region CR4 may be determined to be the selected region.

In another example, suppose that the value of the delivery target determination rule data is "controller-operating user." In this case, a known image recognition technique is used to identify an image of the controller 26 disposed in the captured image 44, the identified image being the image of the indicator I for example. At this point, the image of the indicator I illuminated in a specific color may be identified. The selected region is determined on the basis of the relations between the position of the image of the indicator I in the captured image 44 on one hand and the positions of the candidate regions CR1 to CR4 on the other hand. Specifically, of the candidate regions CR1 to CR4, the region whose center of gravity has the shortest distance to a line L extending upward in FIG. 8 from the center of gravity G of a region occupied by the image of the indicator I may be determined to be the selected region. In this case, too, the candidate region CR4 is determined to be the selected region. The manner in which to determine the selected region based on the position of the image of the controller 26 is not limited to what was described above. Alternatively, of the candidate regions CR1 to CR4, the region whose center of gravity has the shortest distance to the center of gravity of the region occupied by the image of the indicator I may be determined to be the selected region.

In the present embodiment, the user may input a predetermined phrase by voice, which will trigger the process of determining the selected region as described above. The predetermined phrase will be referred to as the first magic word hereunder. Until and unless the user again inputs the first magic word by voice, the position of the selected region in the captured image 44 of each frame remains unchanged. Obviously, the selected region may alternatively be determined for each frame as described above. Still, the process of determining the selected region involves relatively high processing load. In that regard, determining the selected region in response to voice input exerts less processing load on the game device 20 than if the selected region is determined for each frame. In another example, the process of determining the selected region may be carried out when the user initializes the cameras 24a on a screen for making delivery-related settings at the time of starting moving image delivery. In yet another example, the process of determining the selected region may be performed in response to the user's operation such as making of a change in the settings of the cameras 24a.

The present embodiment generates the user image 46 on the basis of the image occupying the selected region determined as described above. In the present embodiment, the user may input by voice a predetermined phrase different from the first magic word. The voice input triggers a switchover between two cases: one in which the user image 46 such as one shown in FIG. 5 is disposed in the delivery image 40, and another in which the user image 46 such as one in FIG. 6 is disposed in the delivery image 40. The different predetermined phrase above will be referred to as the second magic word hereunder.

In the example of FIG. 5, the image occupying the selected region is generated as the user image 46 disposed in the delivery image 40. In the example of FIG. 6, the image occupying the selected region is subjected to mask processing extracting a portion of the image, the extracted portion being generated as the user image 46 that is disposed in the delivery image 40. Such mask processing is performed, for example, on the basis of the distance distribution image which is generated by the cameras 24a and which has the same frame as the captured image 44. In this manner, the present embodiment allows the user to switch between two cases by voice input: one case in which the image occupying the selected region is disposed as the user image 46, and another case in which the image derived from mask processing performed on the image occupying the selected region is disposed as the user image 46.

Figure 10:
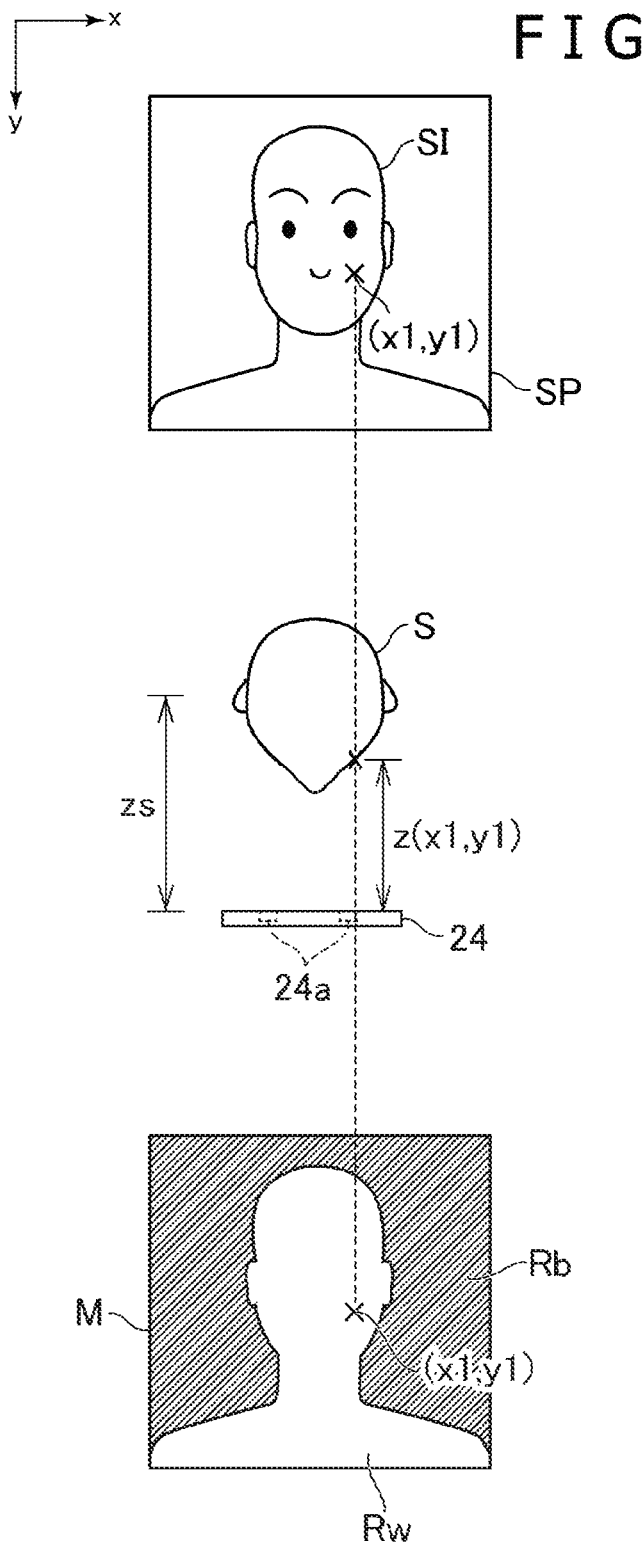
FIG. 10 is a schematic view showing typical relations between a selected region image and a mask image.

Described further below with reference to FIG. 10 is the process of generating the user image 46 such as one shown in FIG. 6 on the basis of the distance distribution image. In the ensuing description, the image occupying the selected region in the captured image 44 will be referred to as the selected region image SP. FIG. 10 shows the selected region image SP in which an image SI of a subject S is disposed.

The gradation value of the color of each pixel included in the distance distribution image is typically associated with the distance between the cameras 24a and the subject S. As shown in FIG. 10, it is assumed for example that each pixel in the captured image 44 has coordinate values of (x1, y1) and that a distance of $z(x1, y1)$ exists between the subject S associated with that pixel and the cameras 24a in a direction perpendicular to a plane of projection of the captured image 44. If the distance distribution image is a gray scale image, then the larger the values of $z(x1, y1)$, the darker the color of the pixel having the coordinate values of (x1, y1) in the distance distribution image. This generates, as shown in FIG. 10, a mask image M that binarizes each pixel included in the distance distribution image depending on whether the color of the pixel is lighter or darker than a reference color. An example of the reference color may be a color the gradation value of which is the mean value of the gradation values of the pixels included in the distance distribution image. In another example, the position of a face image in the selected region image SP is arranged to be detected, so that the reference color may be determined as the color having the gradation value of the pixel at a position within the distance distribution image which is associated with the detected position. In still another example, a region occupied by a face image in the selected region image SP is arranged to be detected, so that the reference color may be determined as the color having the gradation value represented by the mean value of the gradation values of the pixels inside a region within the distance distribution image which is associated with the detected region. In such cases, those pixels in the mask image M that are associated with the pixels lighter than the reference color in the distance distribution image are deemed to be white. Those pixels in the mask image M that are associated with the pixels darker than the reference color in the distance distribution image are deemed to be black.

As shown in FIG. 10, reference character zs is assumed to represent the mean distance between the cameras 24a and the subject S in a direction perpendicular to a plane of projection of the captured image 44 associated with the above-mentioned reference color. In this case, a relationship of $z(x1, y1)<zs$ holds, so that the pixels whose coordinate values are (x1, y1) in the mask image M become white in color.

The distance distribution image may be subjected to such image processing as gradation and motion blur. The distance distribution image thus processed may be used as the basis for generating the mask image M.

The mask image M shown in FIG. 10 indicates a subject region Rs occupied by the pixels turned white and a background region Rb occupied by the pixels turned black through binarization. The user image 46 shown in FIG. 6 is then generated by removing from the selected region image SP the pixels associated with the background region Rb in the mask image M. Alternatively, instead of removing from the selected region image SP the pixels associated with the background region Rb in the mask image M, it is possible to turn the associated pixels into a transparent color.

If there exist a plurality of subject regions Rs occupied by adjacent groups of white pixels in the mask image M, the subject regions Rs except for the largest one may be changed into the background region Rb. This makes it possible to extract, even in a case where a plurality of user images are included in the selected region image SP, the user image occupying the largest region.

When delivering the delivery image 40, the present embodiment may exclude an unwanted image such as a family member's face image from the delivery image 40 without requiring the user to suitably readjust the position and orientation of the cameras 24a. This saves more time and effort than ever in excluding the unwanted image from the delivery image 40 in delivery of the delivery image 40.

In another example, a user image 46 may be disposed in the delivery image 40 as shown in FIG. 6, the user image 40 occupying in the captured image 44 a region in which is disposed an image of the subject having a distance to the cameras 24a, the distance being shorter than a reference distance in a direction perpendicular to a plane of projection of the captured image 44. This makes it possible to exclude from the delivery image 40 the image of the user's background such as the image of the room interior. In still another example, the regions inside the captured image 44 subject to the above-described processing may be limited in such a manner that the quality of the delivery image 40 excluding the background image, e.g., the possibility of the background image not being included in the delivery image 40, is guaranteed to be higher than a predetermined level.

As another alternative, the region inside the delivery image 40 in which the user's image is detected may be used for gesture detection. For example, if the user's image is detected in a bottom right region of the screen, an "enter" command may be input; if the user's image is detected in a bottom left region of the screen, a "cancel" command may be input. In this manner, gestures may replace the key input performed with an operating member such as the controller 26.

A user near the controller 26 or a login user is highly likely to be the user playing the game. Thus if an image of the user playing the game is desired to be included in the delivery image 40, it may be appropriate to set the value of the delivery target determination rule data to "login user" or "controller-operating user."

The value of the delivery target determination rule data is not limited to what was described above. Suppose, for example, that the value of the delivery target determination rule data is "registered approving user." In this case, as shown in FIG. 11, the account data may include approval/denial data indicating whether a corresponding user image 46 is approved to be included in the delivery image 40. Thus in this case, of the candidate regions CR1 to CR4, the region including a particular image may be determined to be the selected region, the particular image being most similar to the registered face image associated with the user whose approval/denial data is set for approval.

In the example of FIG. 11, the user whose user ID is "a123" and the user whose user ID is "b456" have the values of their approval/denial data set for approval. There may be a plurality of users having the values of their approval/denial data set for approval. In this case, of the candidate regions CR1 to CR4, those including the images most similar to the registered face images associated with the multiple approving users are determined to be the selected regions. In this example, the candidate regions CR2 and CR4 are determined to be the selected regions. A plurality of regions may be determined to the selected regions in this manner.

Figure 12:
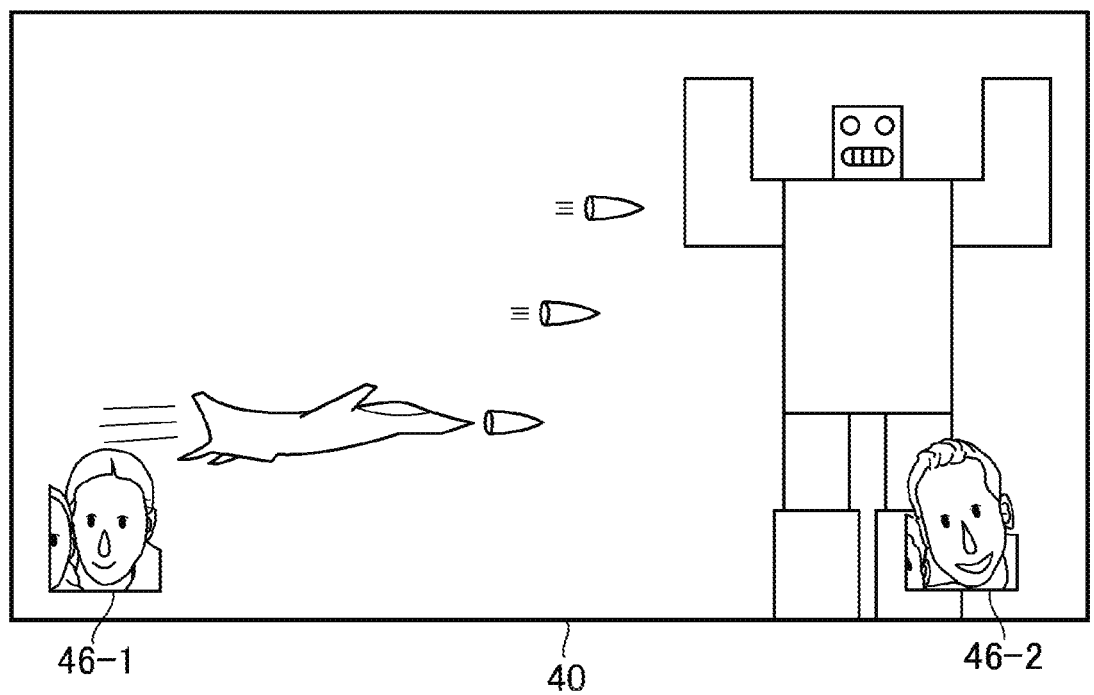
FIG. 12 is a schematic view showing another typical delivery image.

In that case, as shown in FIG. 12, a plurality of user images 46 are disposed in the delivery image 40. FIG. 12 shows an example in which the candidate regions CR2 and CR4 are determined to be the selected regions. A first user image 46-1 is the user image 46 associated with the candidate region CR2, and a second user image 46-2 is the user image 46 associated with the candidate region CR4.

In the manner described above, the delivery image 40 is arranged to include the user images 46 of the users whose approval/denial data have their values set for approval. The present embodiment thus makes it possible to suitably determine which image is to be included in the delivery image 40 in accordance with the delivery target determination rule data.

In another example, a plurality of users may be allowed to log in to the game device 20. In this case, too, a plurality of regions are determined to be the selected regions.

In still another example where a user is detected to make a specific gesture such as raising of a hand in the captured image 44, the region in the captured image 44 in which the image of the hand-raising user is disposed may be determined to be the selected region.

In yet another example, when a user logs in to the game device 20, the login user may be associated with the controller 20 operated by the user. Upon detection of an operation to start delivering a moving image performed on the controller 26 such as pressing of the button SH, the user performing the operation may be identified, and the region in the captured image 44 in which the image of the identified user is disposed may be determined to be the selected region.

It was explained above that the user image 46 is disposed at the bottom left or at the bottom right of the delivery image 40. Alternatively, the position and size of the region where the user image 46 is disposed may be determined depending on the state of the game being played. For example, the user image 46 may be arranged not to be disposed in a region where game-related information such as scores is displayed. In an important scene of the game such as one in which a stage is cleared, a larger-than-usual user image 46 may be disposed in the delivery image 40.

In another example, the display unit 22 may be arranged to display a moving image made up of a series of delivery images 40 or a moving image constituted by a series of play images 42.

In still another example, the image occupying the selected region in the captured image 44 or the image having undergone mask processing as described above may be replaced with its enlarged or reduced version as the user image 46 that may be disposed in the delivery image 40.

Described further below are the functions implemented by the game device 20 of the present embodiment and the processes performed by the game device 20.

Figure 13:
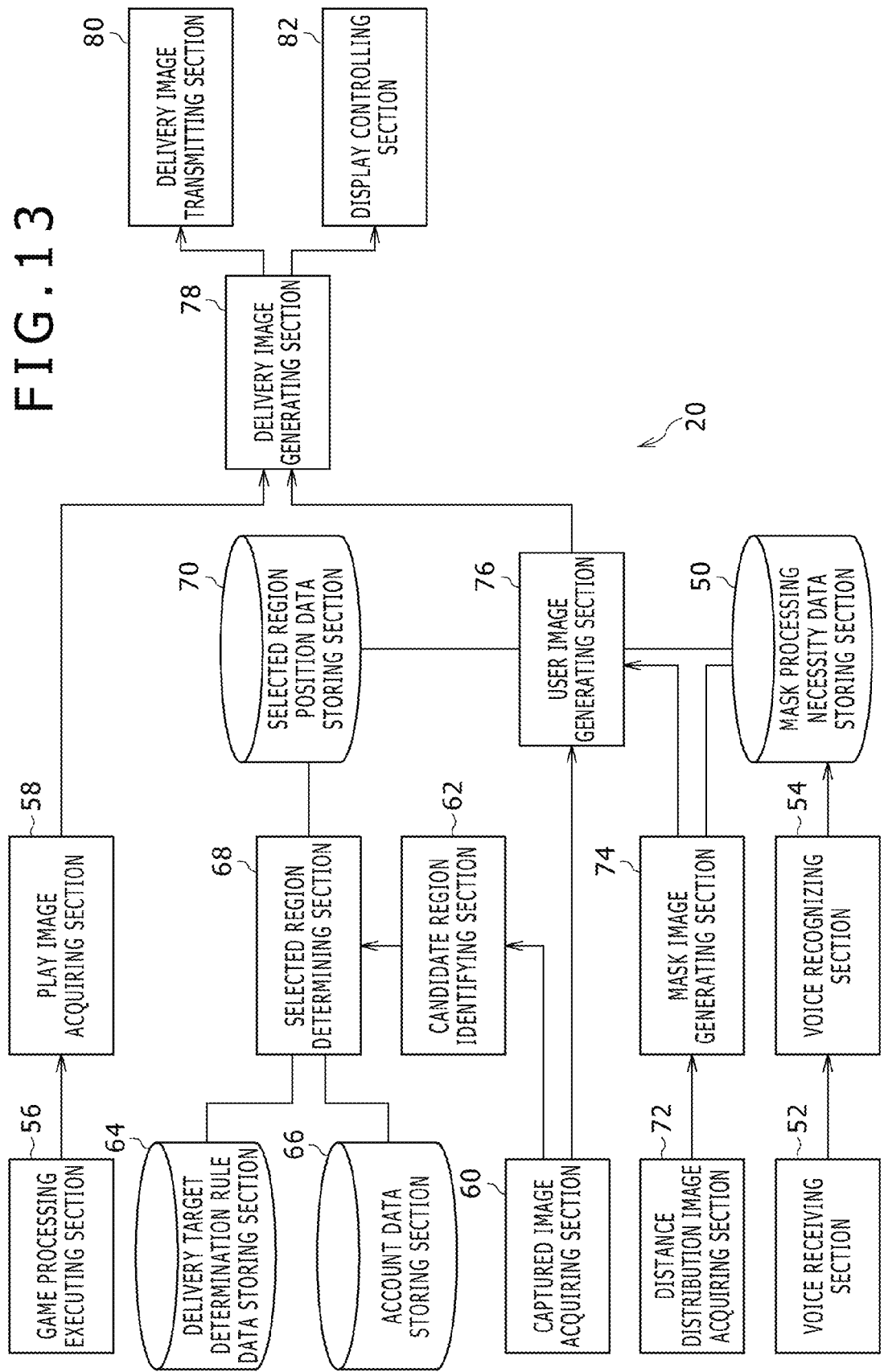
FIG. 13 is a functional block diagram showing typical functions implemented by a game device as an embodiment of the present invention.

FIG. 13 is a functional block diagram showing typical functions implemented by the game device 20 of the present embodiment. Not all functions shown in FIG. 13 need to be implemented by the game device 20 of the present embodiment. Functions other than those shown in FIG. 13 may be implemented by the game device 20.

As shown in FIG. 13, the game system 10 of the present embodiment functionally includes a mask processing necessity data storing section 50, a voice receiving section 52, a voice recognizing section 54, a game processing executing section 56, a play image acquiring section 58, a captured image acquiring section 60, a candidate region identifying section 62, a delivery target determination rule data storing section 64, an account data storing section 66, a selected region determining section 68, a selected region position data storing section 70, a distance distribution image acquiring section 72, a mask image generating section 74, a user image generating section 76, a delivery image generating section 78, a delivery image transmitting section 80, and a display controlling section 82. The mask processing necessity data storing section 50, delivery target determination rule data storing section 64, account data storing section 66, and selected region position data storing section 70 are implemented using mainly the storage section 32. The voice receiving section 52 is implemented using mainly the input/output section 36. The voice recognizing section 54, game processing executing section 56, play image acquiring section 58, candidate region identifying section 62, selected region determining section 68, mask image generating section 74, user image generating section 76, and delivery image generating section 78 are implemented using mainly the control section 30. The captured image acquiring section 60 and distance distribution image acquiring section 72 are implemented using mainly the input/output section 36. The delivery image transmitting section 80 is implemented using mainly the communication section 34. The display controlling section 82 is implemented using mainly the control section 30 and input/output section 36. Thus configured, the game device 20 of the present embodiment plays the role of an image processing system that saves more time and effort than ever in excluding an unwanted image from the image to be delivered.

The above-described functions are implemented when the control section 30 executes a program which is installed in the game device 20 serving as a computer and which includes the commands corresponding to these functions. The program is supplied to the game device 20 by means of a computer-readable information storage medium such as an optical disk, a magnetic disk, a magnetic tape, a magneto-optical disk, or a flash memory; or via communication means such as the Internet.

The mask processing necessity data storing section 50 stores mask processing necessity data indicative of whether the image occupying the selected region needs to undergo mask processing upon generation of the user image 46 such as one shown in FIG. 5 or 6. For example, the present embodiment does not perform mask processing if the value of the mask processing necessity data is 0 and performs mask processing if the value of the mask processing necessity data is 1.

The voice receiving section 52 receives voice. In the present embodiment, the voice receiving section 52 receives the user's voice input through the microphones 24b for example.

The voice recognizing section 54 recognizes the voice received by the voice receiving section 52. In the present embodiment, the voice recognizing section 54 determines whether a voice representing the first or the second magic word is input. Every time a voice representing the second magic word is determined to be input, the voice recognizing section 54 in the present embodiment changes the value of the mask processing necessity data from 0 to 1 or vice versa in the mask processing necessity data storing section 50.

The game processing executing section 56 executes the game program installed in the game device 20. Also, the game processing executing section 56 varies the state of the game in response to the input operations received from the controller 26. Furthermore, the game processing executing section 56 generates the play image 42 at a predetermined frame rate, the play image 42 being indicative of game play content as shown in FIG. 7.

The play image acquiring section 58 acquires the play image 42 generated by the game processing executing section 56.

The captured image acquiring section 60 acquires the captured image 44 such as one shown in FIG. 8, the captured image 44 being captured by the cameras 24a at a predetermined frame rate.

The candidate region identifying section 62 identifies, in the manner described above, at least one candidate region CR occupying a portion of the captured image 44.

The delivery target determination rule data storing section 64 stores the above-described delivery target determination rule data.

The account data storing section 66 stores the account data shown in FIGS. 9 and 11 for example.

The selected region determining section 68 determines, in the manner described above, the selected region from at least one candidate region CR identified by the candidate region identifying section 62. Also, the selected region determining section 68 generates selected region position data indicating the position of the selected region determined inside the captured image 44, and stores the selected region position data into the selected region position data storing section 70. For example, the selected region position data represents the coordinate values of each of the four vertexes of a rectangular selected region within the captured image 44.

The selected region determining section 68 may further determine, as described above, the selected region on the basis of the user images such as the registered face images included in the account data stored in the account data storing section 66. The selected region determining section 68 may also determine the selected region on the basis of information associated with user images, such as data indicative of the feature quantities of images.

The selected region position data storing section 70 stores the selected region position data generated by the selected region determining section 68.

The distance distribution image acquiring section 72 acquires the above-mentioned distance distribution image generated by the cameras 24a at a predetermined frame rate.

The mask image generating section 74 generates the mask image M such as one shown in FIG. 10 on the basis of two images: the image occupying the selected region in the captured image 44, and the distance distribution image acquired by the distance distribution image acquiring section 72.

The user image generating section 76 generates the user image 46 which, as shown in FIGS. 5 and 6, occupies in the captured image 44 the selected region in which is disposed the image of the user as the delivery target. Alternatively, the user image generating section 76 may generate the user image 46 occupying the selected region in which is disposed the image of the user playing the game, as described above.

If the value of the mask processing necessity data is 0 in the mask processing necessity data storing section 50, the user image generating section 76 of the present embodiment generates as the user image 46 the image occupying in the captured image 44 the selected region determined by the selected region determining section 68 as shown in FIG. 5. If the value of the mask processing necessity data is 1 in the mask processing necessity data storing section 50, the user image generating section 76 generates the user image 46 such as one shown in FIG. 6 by performing mask processing on the image occupying in the captured image 44 the selected region determined by the selected region determining section 68. In this case, the user image generating section 76 may perform the mask processing based on the mask image M generated by the mask image generating section 74 for example. The user image generating section 76 further generates the user image 46 occupying in the captured image 44 the region in which is disposed an image of the subject having a distance to the cameras 24a, the distance being shorter than a reference distance in a direction perpendicular to a plane of projection of the captured image 44.

As described above, the user image 46 may be considered to be an image internal to the captured image 44, the internal image occupying the region in which is disposed the image of the user as the delivery target. In the user image 46 shown in FIG. 5, the selected region in the captured image 44 corresponds to the region in which is disposed the image of the user as the delivery target. In the user image 46 shown in FIG. 6, on the other hand, a portion of the selected region disposed in the captured image 44 and associated with the subject region Rs shown in FIG. 10 corresponds to the region in which is disposed the image of the user as the delivery target.

Alternatively, the user image generating section 76 may, as described above, generate the user image 46 occupying the region in which is disposed the user's image identified on the basis of the position in the captured image 44 of the region in which is disposed an image of the controller 26 being used to play the game.

In another example where the selected region determining section 68 is determined on the basis of the registered face images or the information associated with user images such as the feature quantities of the images, the user image generating section 76 generates the user image 46 occupying in the captured image 44 the region in which is disposed the image or an image identified on the basis of the information. In this case, the user image generating section 76 may generate the user image 46 occupying in the captured image 44 the region in which is disposed the image of the user having logged in to play the game or the image identified on the basis of the information associated with the image of the login user.

The delivery image generating section 78 of the present embodiment generates the delivery image 40 such as one shown in FIG. 5 or 6 on the basis of two images: the play image 42 acquired by the play image acquiring section 58, and the user image 46 generated by the user image generating section 76. For example, the delivery image generating section 78 of the present embodiment may generate the delivery image 40 as shown in FIGS. 5 and 6, the delivery image 40 being one in which the user image 46 generated by the user image generating section 76 is disposed in a region occupying a portion of the play image 42 acquired by the play image acquiring section 58. In another example, as described above, the delivery image generating section 78 may generate the delivery image 40 in which the user image 46 is disposed in a region occupying a portion of the play image 42, the region being determined depending on the state of the game currently played. In still another example, the delivery image generating section 78 may generate the delivery image 40 in which the user image 46 and a reduced play image 42 are juxtaposed.

The delivery image transmitting section 80 transmits the delivery image 40 generated by the delivery image generating section 78 to the moving image delivery system 12. In the present embodiment, the delivery image transmitting section 80 transmits to the moving image delivery system 12 a moving image that includes as frame images a series of delivery images 40 generated at a predetermined frame rate. The moving image transmitted in this manner is streamed live from the moving image delivery system 12 to the viewing user terminals 14. Also, the moving image delivery system 12 stores the moving image inside. The moving image thus stored is delivered upon request to the requesting viewing user terminals 14.

The display controlling section 82 causes the display unit 22 to display the delivery image 40 such as one shown in FIG. 5 or 6. In the present embodiment, the display controlling section 82 causes the display unit 22 to display a moving image that includes as frame images a series of delivery images 40 generated at a predetermined frame rate. Alternatively, the display controlling section 82 may cause the display unit 22 to display the play image 42 such as one shown in FIG. 7 instead of the delivery image 40. In this case, the display controlling section 82 causes the display unit 22 to display a moving image that includes as frame images a series of play images 42 generated at the predetermined frame rate.

Figure 14:
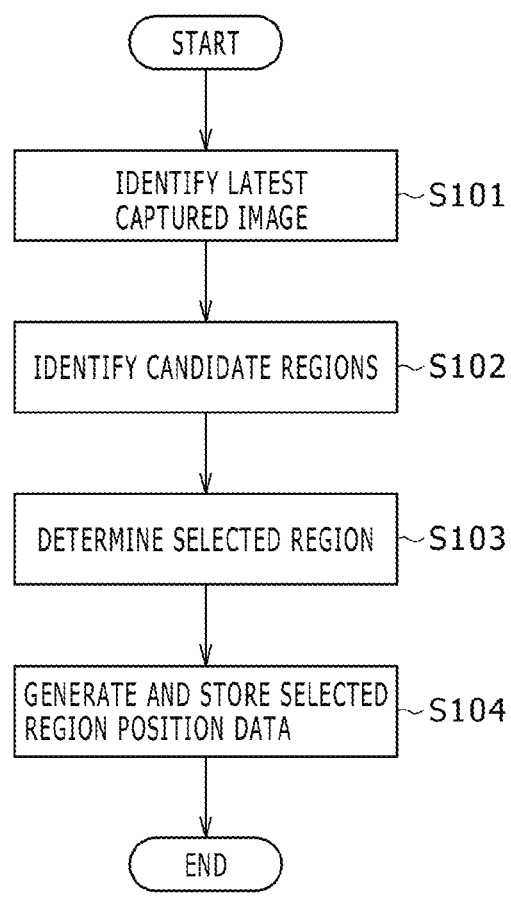
FIG. 14 is a flowchart of processing steps performed by the game device embodying the present invention.

Described below with reference to the flowchart of FIG. 14 is a typical series of processing steps performed by the game device 20 of the present embodiment to determine the selected region upon detection of the input of a voice representing the first magic word.

The selected region determining section 68 first identifies the latest captured image 44 acquired by the captured image acquiring section 60 (S101). The selected region determining section 68 then identifies at least one candidate region CR (S102) in the captured image 44 identified in step S101. The selected region determining section 68 proceeds to determine (S103) the selected region from the candidate regions CR identified in step S102 on the basis of the rules denoted by the delivery target rule data stored in the delivery target determination rule data storing section 64. If the value of the delivery target determination rule data is "login user" or "registered approving user" at this point, the selected region determining section 68 may determine the selected region based on the registered face images included in the account data stored in the account data storing section 66 as described above. The selected region determining section 68 then generates the selected region position data indicating the position of the selected region determined in step S103 inside the captured image 44, and stores the selected region position data into the selected region position data storing section 70 (S104).

Figure 15:
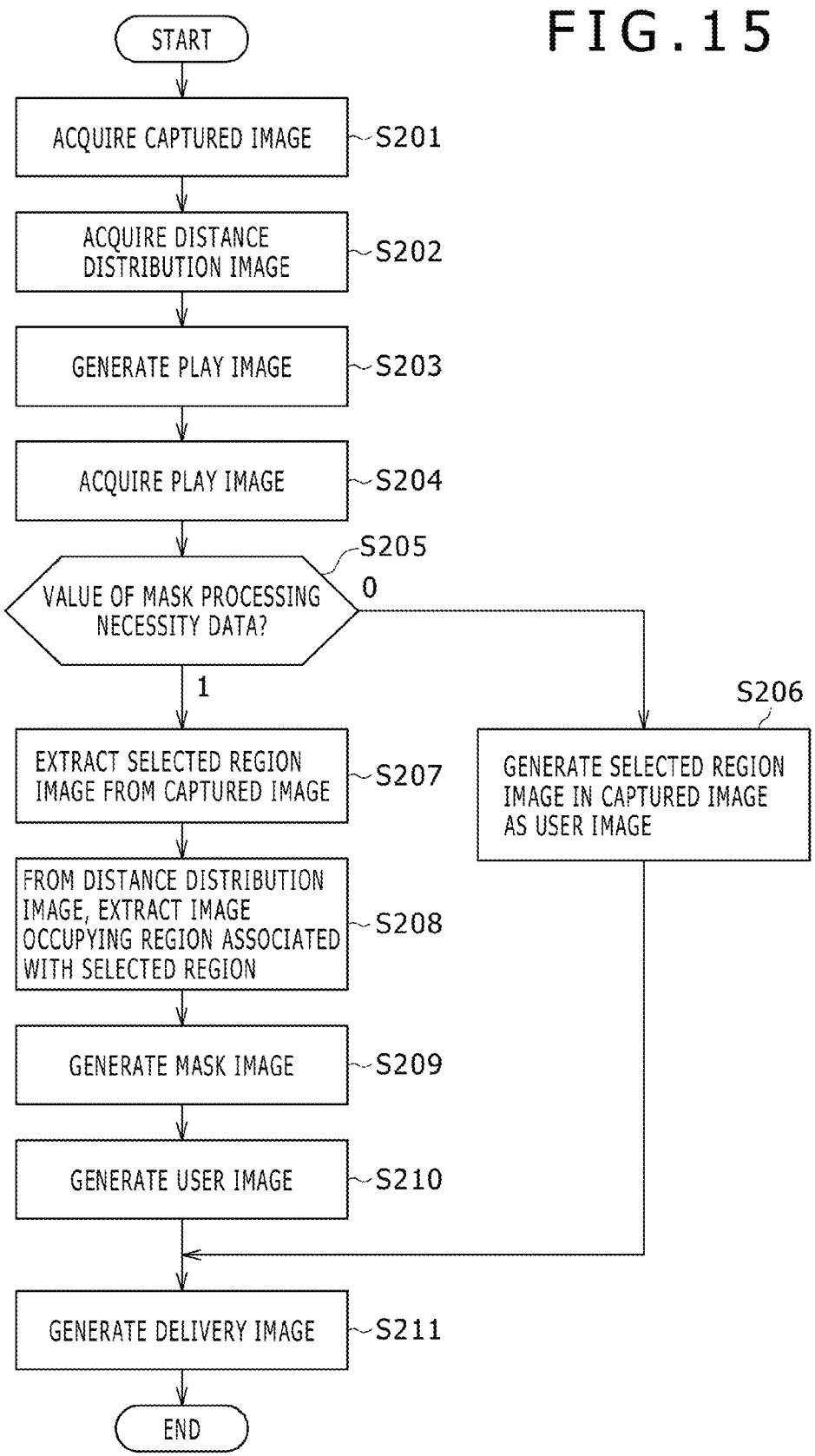
FIG. 15 is a flowchart of other processing steps performed by the game device embodying the present invention.

Described below with reference to the flowchart of FIG. 15 is a typical series of processing steps performed by the game device 20 of the present embodiment to generate the delivery image 40 at a predetermined frame rate.

The captured image acquiring section 60 first acquires the captured image 44 captured in the current frame (S201). The distance distribution image acquiring section 72 acquires the distance distribution image generated in this frame (S202). The game processing executing section 56 generates the play image of this frame (S203). The play image acquiring section 58 then acquires (S204) the play image generated in step S203.

The user image generating section 76 checks the value of the mask processing necessity data stored in the mask processing necessity data storing section 50 (S205).

If the value of the mask processing necessity data is 0 at this point, the user image generating section 76 generates (S206) as the user image 46 the image occupying the selected region in the captured image 44 acquired in step S201. The selected region can be identified on the basis of the position indicated by the selected region position data stored in the selected region position data storing section 70.

On the other hand, if the value of the mask processing necessity data is 1, the user image generating section 76 extracts (S207) the selected region image SP such as one shown in FIG. 10 from the captured image 44 acquired in step S201. For example, extracted at this point is the selected region image SP occupying the selected region in the position indicated by the selected region position data stored in the selected region position data storing section 70. From the distance distribution image acquired in step S202, the mask image generating section 74 extracts the image occupying the region associated with the selected region in the position indicated by the selected region position data stored in the selected region position data storing section 70 (S208). In this case, for example, the combination of the coordinate values representing the four vertexes of the selected region in the captured image 44 may coincide with the combination of the coordinate values indicating the four vertexes of the region occupied by the image extracted from the distance distribution image. The mask image generating section 74 then generates (S209) the mask image M such as one shown in FIG. 10 by performing image processing including gradation, motion blur, and binarization on the image extracted in step S208. The user image generating section 76 generates (S210) the user image 46 such as one shown in FIG. 6 on the basis of two images: the image extracted in step S207, and the mask image M generated in step S209.

In steps S206 and S210, either one or a plurality of user images 46 may be generated as described above.

The delivery image generating section 78 generates (S211) the delivery image 40 such as one shown in FIG. 5 or 6 by disposing the user image 46 generated in step S206 or S210 into the region occupying a portion of the play image 42 acquired in step S204.

The above-described embodiment is not limitative of the present invention.

For example, the above-described steps S101 through S104 may be interposed between step S204 and step S205 above regarding the frame in which the voice recognizing section 54 recognized the input of a voice representing the first magic word, or regarding the next frame.

In another example, the game device 20 may transmit the user image 46 generated in step S206 or S210 to the moving image delivery system 12 along with the play image 42 acquired in step S204. The moving image delivery system 12 may then generate the delivery image 40 based on the user image 46 and the play image 42.

The game device 20 may be constituted by a plurality of housings.

The game system 10 may be replaced with a personal computer, a handheld video game machine, a smartphone, a tablet terminal, or some other suitable apparatus playing the role of the game system 10.

In the foregoing description and in the accompanying drawings, specific character strings are only examples that are not limitative of the present invention.

The invention claimed is:

1. An image processing system comprising:
    a play image acquiring section configured to acquire a play image indicative of the content of a game being played by a user in a real space;
    a captured image acquiring section configured to acquire a captured image of at least a portion of the real space captured by a camera during play of the game, where the captured image includes images of at least a portion of the user and at least one other person in the real space;
    a user image generating section configured to generate a user image from the image of the at least a portion of the user from the captured image; and
    a delivery image generating section configured to generate a delivery image that includes the play image and the user image superimposed on the play image,
    wherein the user image is discriminated from other images within the captured image by: (i) performing facial recognition on the captured image to extract a plurality of face images therefrom, and (ii) determining whether any of the plurality of face images is that of the user that has logged in to play the game, and at least one of: (iii) determining whether any of the plurality of face images is of the user holding a controller being used to play the game as opposed to the at least one other person not holding a controller, and (iv) determining whether any of the plurality of face images is of a face that is a distance to the camera, the distance being shorter than a reference distance.

2. The image processing system according to claim 1, wherein the delivery image is generated such that the user image is disposed in a region within the play image.

3. The image processing system according to claim 1, wherein the user image generating section does not include any image data of any faces within the captured image that are determined through facial recognition not to be of the user that has logged in to play the game.

4. The image processing system according to claim 1, wherein the user image generating section performs the facial recognition by comparing the at least a portion of the user within the captured image with a user image stored in a storage section or an image identified on the basis of information associated with the stored user image.

5. The image processing system according to claim 1, wherein the delivery image generating section generates the delivery image such that a region within the play image in which the user image is superimposed is determined depending on a state of the game being played.

6. An image processing method comprising:
    acquiring a play image indicative of the content of a game being played by a user in a real space;
    acquiring a captured image of at least a portion of the real space captured by a camera during play of the game, where the captured image includes images of at least a portion of the user and at least one other person in the real space;
    generating a user image from the image of the at least a portion of the user from the captured image; and
    generating a delivery image that includes the play image and the user image superimposed on the play image,
    wherein the user image is discriminated from other images within the captured image by: (i) performing facial recognition on the captured image to extract a plurality of face images therefrom, and (ii) determining whether any of the plurality of face images is that of the user that has logged in to play the game, and at least one of: (iii) determining whether any of the plurality of face images is of the user holding a controller being used to play the game as opposed to the at least one other person not holding a controller, and (iv) determining whether any of the plurality of face images is of a face that is a distance to the camera, the distance being shorter than a reference distance.

7. A non-transitory, computer readable storage medium containing a computer program for causing a computer to carry out actions, comprising:
    acquiring a play image indicative of the content of a game being played by a user in a real space;
    acquiring a captured image of at least a portion of the real space captured by a camera during play of the game, where the captured image includes images of at least a portion of the user and at least one other person in the real space;

generating a user image from the image of the at least a portion of the user from the captured image; and generating a delivery image that includes the play image and the user image superimposed on the play image, wherein the user image is discriminated from other images within the captured image by: (i) performing facial recognition on the captured image to extract a plurality of face images therefrom, and (ii) determining whether any of the plurality of face images is that of the user that has logged in to play the game, and at least one of: (iii) determining whether any of the plurality of face images is of the user holding a controller being used to play the game as opposed to the at least one other person not holding a controller, and (iv) determining whether any of the plurality of face images is of a face that is a distance to the camera, the distance being shorter than a reference distance.

* * * * *